United States Patent
Yamaguchi

(10) Patent No.: US 7,948,539 B2
(45) Date of Patent: May 24, 2011

(54) SIGNAL DETECTION METHOD AND APPARATUS, AND RADIATION IMAGE SIGNAL DETECTION METHOD AND SYSTEM

(75) Inventor: Akira Yamaguchi, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 606 days.

(21) Appl. No.: 11/816,577

(22) PCT Filed: Feb. 8, 2006

(86) PCT No.: PCT/JP2006/302145
§ 371 (c)(1),
(2), (4) Date: Aug. 17, 2007

(87) PCT Pub. No.: WO2006/087952
PCT Pub. Date: Aug. 24, 2006

(65) Prior Publication Data
US 2009/0201373 A1 Aug. 13, 2009

(30) Foreign Application Priority Data
Feb. 17, 2005 (JP) ................................. 2005-040674

(51) Int. Cl.
*H04N 5/217* (2011.01)
*H04N 3/14* (2006.01)
*H04N 5/335* (2011.01)
(52) U.S. Cl. ........................................ 348/300; 348/241
(58) Field of Classification Search .................. 348/241, 348/300; 250/370.08, 370.09; 327/91
See application file for complete search history.

(56) References Cited

U.S. PATENT DOCUMENTS

| 5,554,944 | A | * | 9/1996 | Van Buul et al. | 327/91 |
| 6,111,606 | A | * | 8/2000 | Ikeda | 348/241 |
| 6,703,959 | B2 | * | 3/2004 | Kuwabara | 341/155 |
| 7,135,681 | B2 | * | 11/2006 | Yamaguchi | 250/336.1 |
| 7,257,500 | B2 | * | 8/2007 | Yamaguchi | 702/69 |
| 7,586,526 | B2 | * | 9/2009 | Kurokawa et al. | 348/243 |

FOREIGN PATENT DOCUMENTS
JP 2003-153088 A 5/2003

OTHER PUBLICATIONS

R.L. Weisfield et al., "Electronic noise analysis of a 127-micron pixel TFT/photodiode array", Proceedings of SPIE, 2001, pp. 209-218, vol. 4320.

* cited by examiner

*Primary Examiner* — Sinh Tran
*Assistant Examiner* — Daniel M Pasiewicz
(74) *Attorney, Agent, or Firm* — Sughrue Mion, PLLC

(57) ABSTRACT

A signal detection method including the steps of: initiating integration of charge signals by an integrating amplifier; holding a first electrical signal integrated by the integrating amplifier during a time period from the start of the integration to the end of a predetermined baseline sampling time, and passed through a first low-pass filter having a time constant $\tau 1$; and performing signal detection by obtaining the difference between a second electrical signal and the first electrical signal, the second electrical signal being an electrical signal integrated by the integrating amplifier during a time period from the start of the integration to a predetermined time point which is a time point before the integrating amplifier is reset after the first electrical signal is obtained, and passed through a second low-pass filter having a time constant $\tau 2$ which is greater than the time constant $\tau 1$.

6 Claims, 7 Drawing Sheets

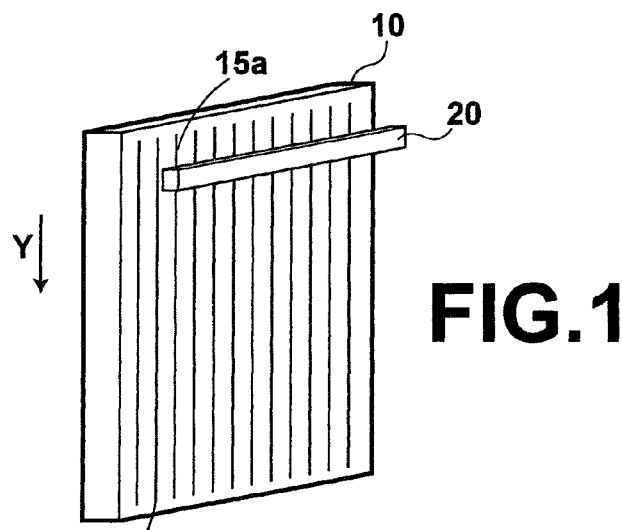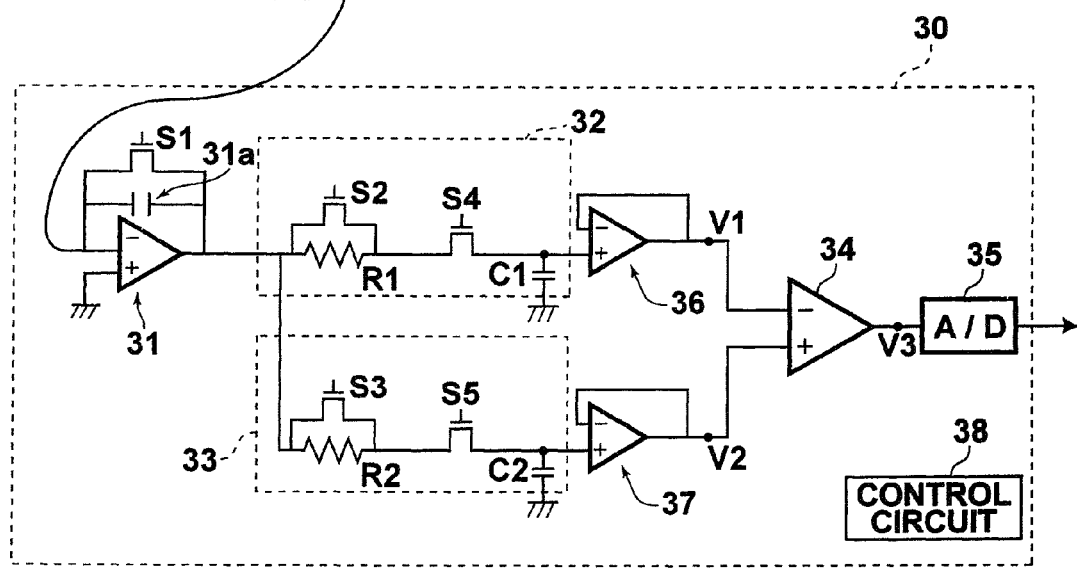
FIG.1

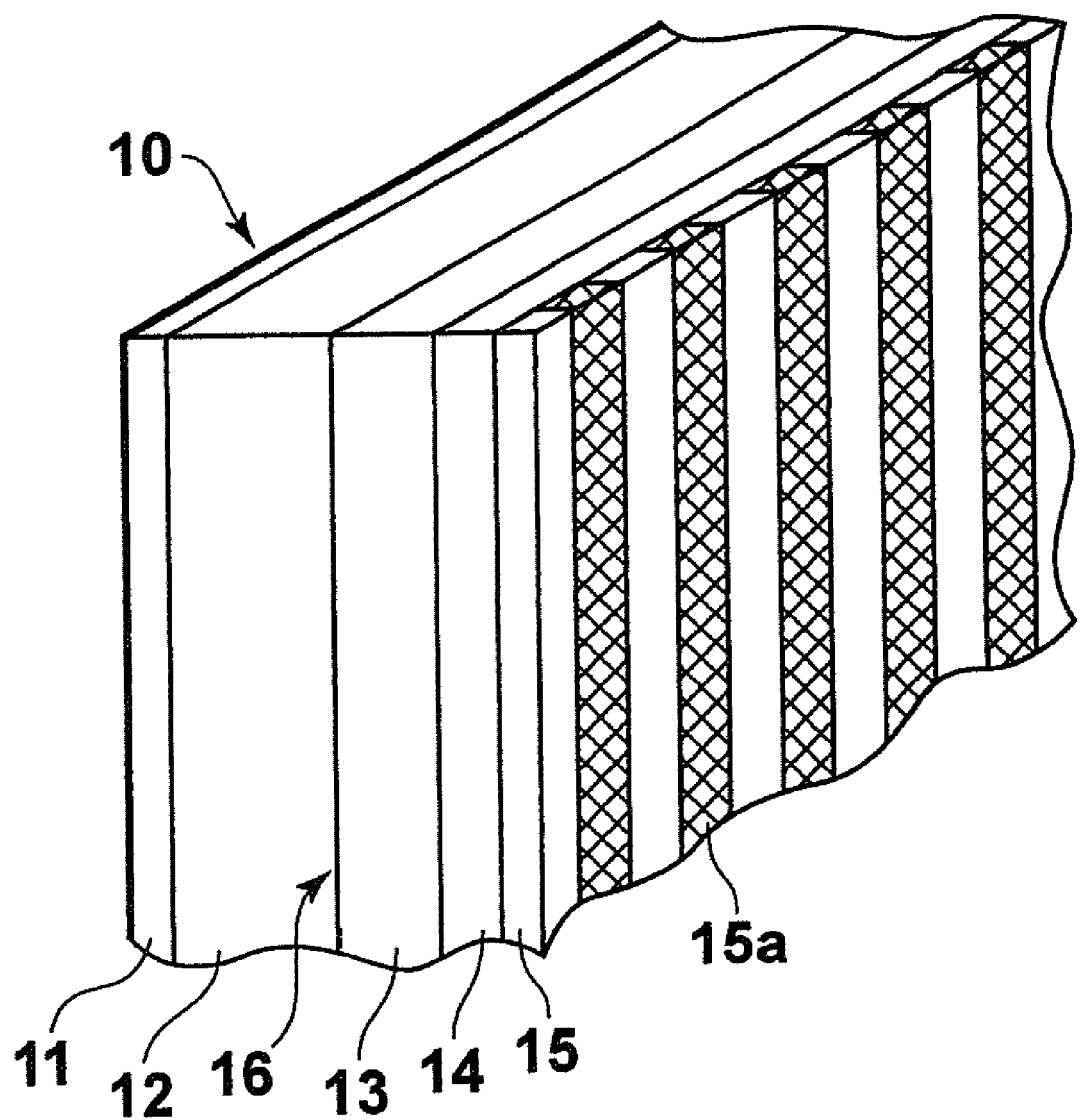

SIGNAL DETECTION METHOD AND APPARATUS, AND RADIATION IMAGE SIGNAL DETECTION METHOD AND SYSTEM

TECHNICAL FIELD

The present invention relates to a signal detection method and apparatus, and a radiation image signal detection method and system, which employ correlated double sampling.

BACKGROUND ART

Devices that convert light or radiation to charge signals and output the converted charge signals are used in various industrial fields. Such devices include photoelectric converters, such as CCDs, photomultipliers, and the like, radiation image recording devices that generate and store charges therein by receiving radiation and output charge signals according to the charges stored therein, and the like.

As for detectors for detecting the charge signals outputted from the photoelectric converters and radiation image recording devices described above, integrating amplifiers are generally used, since such amplifiers may be formed of ICs and have comparatively low noise. The integrating amplifier initiates integration of the charge signals and outputs an electrical signal according to the amount of integrated charges when switched to integration mode, and returns to initial state by discharging the integrated charge signals when switched to reset mode.

Here, the switching to the integration mode of the integrating amplifier is implemented by switching the reset switch on the integrating amplifier from ON to OFF. The switching of the reset switch causes kTC noise of the reset switch to be added to the signal component of the electrical signal. In order to avoid the influence of kTC noise, correlated double sampling is performed, as described, for example, in the non-patent document by R. L. Weisfield and N. Robert Bennett, "Electronic Noise Analysis of a 127-Micron Pixel TFT/Photodiode Array", Proc. SPIE, vol. 4320, pp. 209-218, 2001. The correlated double sampling is a method for avoiding the influence of kTC noise by obtaining the difference between an electrical signal outputted from the integrating amplifier when a predetermined baseline sampling time is elapsed after it is switched to integration mode, and an electrical signal outputted from the integrating amplifier just before it is switched to reset mode, and using the difference as the signal component.

In a signal detection circuit that employs an integrating amplifier like that described above, a low-pass filter is provided at the latter stage of the integrating amplifier in order to reduce thermal noise generated in a signal line connected to the input terminal of the integrating amplifier, and the electrical signal outputted from the integrating amplifier is outputted through the filter.

Here, if the resistance value of the signal line connected to the integrating amplifier is, for example, several hundreds of $k\Omega$, the thermal noise becomes significant with respect to a charge signal flowing through the signal line, since the amount of thermal noise increases with an increase in the resistance value of the signal line. In order to satisfactorily reduce the aforementioned noise, it is necessary to increase the time constant of the low-pass filter according to the amount of the noise.

Baseline sampling (acquisition of electrical signal at the end of the baseline sampling time) in such a correlated double sampling as described above is for sampling kTC noise of an integrating amplifier as described above, and not for reducing noise generated in the signal line described above. Therefore, it is not necessary to increase the time constant when the baseline sampling is performed.

Further, in order to obtain kTC noise with a sufficiently large magnitude in the baseline sampling, it is necessary to sufficiently increase the baseline sampling time with respect to the time constant of the low-pass filter, since the low-pass filter has a transient response characteristic. Thus, if the time constant of the low-pass filter is increased when the baseline sampling is performed as described above, the baseline sampling time will also need to be increased correspondingly, resulting in an unnecessarily prolonged time for signal detection.

The prolonged signal detection time described above makes it impossible to perform high-speed signal detection, for example, detection of semi-motion picture signals.

In view of the circumstances described above, it is an object of the present invention to provide a signal detection method and apparatus, and a radiation image signal detection method and system, which employ correlated double sampling and capable of appropriately reducing noise caused by the line resistance as described above, as well as increasing the speed of signal detection.

DISCLOSURE OF THE INVENTION

The signal detection method of the present invention is a method including the steps of:

initiating integration of charge signals by an integrating amplifier;

holding a first electrical signal integrated by the integrating amplifier during a time period from the start of the integration to the end of a predetermined baseline sampling time, and passed through a first low-pass filter having a time contant $\tau 1$; and performing signal detection by obtaining the difference between a second electrical signal and the first electrical signal, the second electrical signal being an electrical signal integrated by the integrating amplifier during a time period from the start of the integration to a predetermined time point which is a time point before the integrating amplifier is reset after the first electrical signal is obtained, and passed through a second low-pass filter, having a time constant $\tau 2$ which is greater than the time contant $\tau 1$.

In the signal detection method described above, the time constant $\tau 2$ may be set to the same value as that of the time constant $\tau 1$ during the time period from the start of the integration to the end of the predetermined baseline sampling time.

The signal detection apparatus of the present invention is an apparatus including:

an integrating amplifier for integrating charge signals;

a first low-pass filter, having a time contant $\tau 1$ for receiving a signal integrated by the integrating amplifier during a time period from the start of the integration by the integrating amplifier to the end of a predetermined baseline sampling time;

a first holding circuit for holding a first electrical signal passed through the first low-pass filter;

a second low-pass filter, having a time contant $\tau 2$ which is greater than $\tau 1$ for receiving a signal integrated by the integrating amplifier during a time period from the start of the integration by the integrating amplifier to a predetermined time point which is a time point before the integrating amplifier is reset after the first electrical signal is obtained;

a second holding circuit for holding a second electrical signal passed through the second low-pass filter; and a differential circuit for performing signal detection by obtaining the difference between the second electrical signal and the first electrical signal, In the signal detection apparatus described above, the time constant $\tau 2$ may be set to the same value as that of the time constant $\tau 1$ during the time period from the start of the integration to the end of the predetermined baseline sampling time.

The radiation image signal detection method of the present invention is a method in which charge signals outputted from a radiation image recording unit, which stores charges therein by receiving radiation and outputs charge signals according to the charges stored therein, are detected using the signal detection method described above.

The radiation image signal detection system of the present invention is a system including:

the signal detection apparatus described above, and a radiation image recording unit that stores charges therein by receiving radiation and outputs charge signals to the signal detection apparatus described above according to the charges stored therein.

The "first low-pass filter" and "second low-pass filter" described above may share a certain component, or formed of separate components.

As for the "first low-pass filter" and "second low-pass filter" described above, for example, a primary filter may be used.

The "first holding circuit" and "second holding circuit" described above may share a common circuit or formed separately.

According to the signal detection method and apparatus, and the radiation image signal detection method and system, the time constant $\tau 1$ of the low-pass filtering in baseline sampling, and a time constant $\tau 2$ of the low-pass filtering in integrated signal sampling are set to values that satisfy the relationship of $\tau 1 < \tau 2$, so that the speed of signal detection may be increased by reducing the value of $\tau 1$, and noise in the signal component may be reduced sufficiently by setting the $\tau 2$ to an appropriate value.

BRIEF DESCRIPTION OF THE DRAWINGS

FIG. 1 is a schematic configuration diagram of a radiation image signal detection system that employs an embodiment of the signal detection apparatus of the present invention.

FIG. 2 is a schematic configuration diagram of a radiation image recording unit of the radiation image signal detection system shown in FIG. 1.

BEST MODE FOR CARRYING OUT THE INVENTION

Figure 3A:
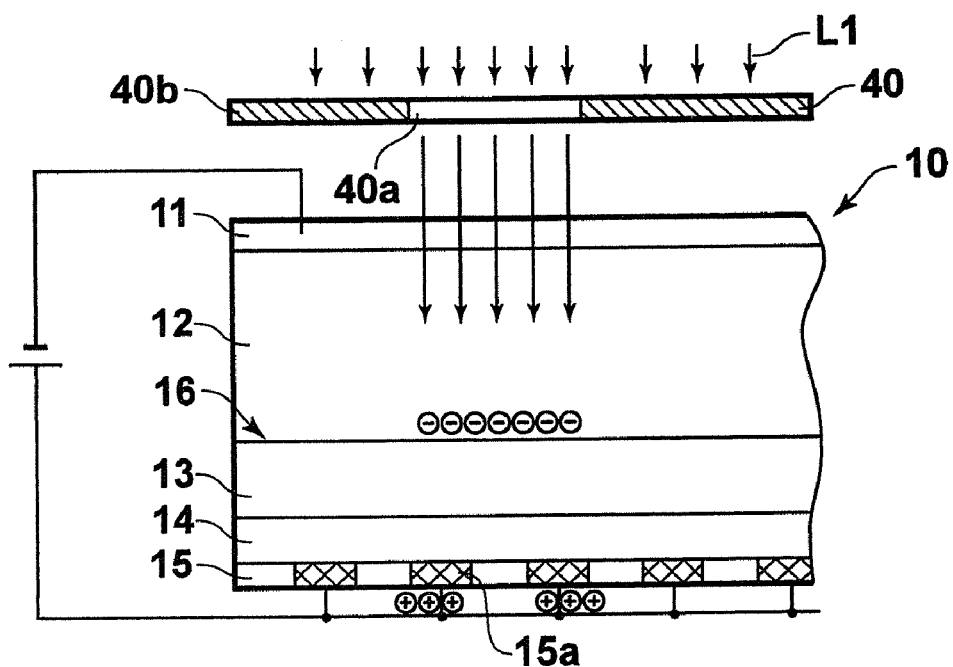
FIG. 3A illustrates an operation of the radiation image recording unit of the radiation image signal detection system shown in FIG. 1 when a radiation image is recorded therein.

Hereinafter, a radiation image signal detection system that employs an embodiment of the signal detection apparatus, which performs the signal detection method of the present invention, will be described with reference to the accompanying drawings. FIG. 1 illustrates a schematic configuration of the radiation image signal detection system.

As illustrated in FIG. 1, the radiation image signal detection system includes: a not shown radiation source; a radiation image recording unit 10 that receives radiation outputted from the radiation source and transmitted through a subject to record the radiation image of the subject and outputs charge signals according to the radiation image recorded therein; a readout light source unit 20 for scanning the radiation image recording unit 10 with linear reading light; and a signal detection apparatus 30 that outputs a digital image signal according to the radiation image based on the charge signals outputted from the radiation image recording unit 10 through the scanning of the readout light by the readout light source unit 20.

The signal detection apparatus 30 includes: an integrating amplifier 31 for integrating the charge signals outputted from the radiation image recording unit 10; first and second holding circuits 32, 33 for holding electrical signals integrated by the integrating amplifier 31; a differential amplifier 34 for outputting the difference between the first and second electrical signals held by the first and second holding circuits 32, 33 respectively; and an A/D converter 35 for converting the analog signal outputted from the differential amplifier 34 to a digital signal. The signal detection apparatus 30 performs correlated double sampling based on the charge signals outputted from the radiation image recording unit 10.

The integrating amplifier 31 includes a capacitor 31a for storing charge signals outputted from the radiation image recording unit 10, and a rest switch S1 for discharging the charge signals stored in the capacitor 31a.

The first holding circuit 32 includes a resistor R1, a switch S2 connected in parallel with the resistance element R1, a switch S4 connected in series with the resistor R1, and a capacitor C1. The first holding circuit 32 holds an electrical signal outputted from the integrating amplifier 31 in the capacitor C1.

The second holding circuit 33 includes a resistor R2, a switch S3 connected in parallel with the resistance element R2, a switch S5 connected in series with the resistor R2, and a capacitor C2. The second holding circuit 32 holds an electrical signal outputted from the integrating amplifier 31 in the capacitor C2.

The first and second holding circuits 32, 33 hold electrical signals outputted from the integrating amplifier 31 at different timings as described above. In addition, they perform low-pass filtering on the electrical signals outputted from the integrating amplifier 31.

More specifically, for example, in the first holding circuit 32, when an electrical signal is stored in the capacitor C1, the switches S2, S4 are switched ON, as will be described later. Thus, a first linear low-pass filter is formed by the resistor R1, on-resistance of the switch S2, on-resistance of the switch S4, and capacitor C1, and a filtered electrical signal filtered by the first low-pass filter is held in the capacitor C1.

In the mean time, when an electrical signal is stored in the capacitor C2 in the second holding circuit 33, the switch S3 is switched OFF, and switch S5 is switched ON, as will be described later. Thus, a second linear low-pass filter is formed by the resistor R2, on-resistance of the switch S5, and capacitor C2, and a filtered electrical signal filtered by the second low-pass filter is held in the capacitor C2.

Here, in the signal detection apparatus of the present embodiment, a time constant $\tau 1$ of the first low-pass filter circuit and a time constant $\tau 2$ of the second low-pass filter circuit are set to values that satisfy the condition of $\tau 1 < \tau 2$. The time constant $\tau 2$ of the second low-pass filter circuit is changeable between a time period of baseline sampling and a time period after the baseline sampling to signal holding, as will be described later. But, the time constant during the time period after the baseline sampling to signal holding will be described here.

If the following are assumed: the resistance value of the resistor R1 is r1, resistance value of on-resistance of the switch S2 is $R_{ON2}$; resistance value of on-resistance of the switch S4 is $R_{ON4}$; and capacitance value of the capacitor C1 is c1, the time constant $\tau 1$ of the first low-pass filter is calculated by Formula (1) below.

$$\tau 1 = (R_{ON2} \times r1/(R_{ON2} \times r1) \times R_{ON4}) \times c1 \quad (1)$$

Accordingly, if $R_{ON2} \ll r1$, then, $$\tau 1 = (R_{ON2} + R_{ON4}) \times c1.$$

Then, if the following are assumed: the resistance value of the resistor R2 is r2; resistance value of on-resistance of the switch S5 is $R_{ON5}$; and capacitance value of the capacitor C2 is c2, the time constant $\tau 2$ of the second low-pass filter is calculated by Formula (2) below.

$$\tau 2 = (r2 + R_{ON5}) \times c2 \quad (2)$$

Accordingly, if $R_{ON5} \ll r2$, then, $$\tau 2 = r2 \times c2.$$

Typically, $R_{ON2}$ and $R_{ON5}$ are several to several hundreds of $\Omega$, so that setting of values to r1 and r2 in the range from several hundreds of K$\Omega$ to a few dozens of M$\Omega$ satisfies the condition of $\tau 1 < \tau 2$. If, for example, the line resistance of a line electrode 15a, which is a signal line and will be described later, is several hundreds K$\Omega$, the time constant $\tau 2$ of the second low-pass filter is preferable to be set to several hundreds μs. Accordingly, values in the range of several dozens to several thousands pF are set to c1 and c2 for the aforementioned resistance values of r1 and r2. For example, r1 =r2=10M$\Omega$, c1=c2=10pF. If the values are set in the manner as described above, a sufficiently long time may be ensured as the time constant $\tau 2$, as well as reducing the time constant $\tau 1$. In order to balance between increased speed and noise reduction, it is preferable that the time constant $\tau 1$ is set to a value in the range of 1 to 10 μs, and $\tau 2$ is set to a value in the range of 10 to 100 μs.

The signal detection apparatus 30 further includes: buffer amplifiers 36, 37 for outputting filtered electrical signals, outputted respectively from the first and second holding circuit 32, 33, to a differential amplifier 34; and a control circuit 38 for controlling operation timings of the reset switch S1 of the integrating amplifier 31, switches S2, S3, S4, and S5 of the first and second holding circuits 32, 33, and an A/D converter 35.

specifically, as shown in FIG. 2, the radiation image recording unit 10 includes the following in the order listed below: a first electrode layer 11 transparent to radiation representing a radiation image; a recording photoconductive layer 12 that generates charges by receiving radiation transmitted through the first electrode layer 11; a charge transport layer 13 that acts as an insulator against charges generated in the recording photoconductive layer 12, and as a conductor for transport charges having the opposite polarity to that of the charges generated in the recording photoconductive layer 12; a reading photoconductive layer 14 that generates charges by receiving reading light; and a second electrode layer 15 having linear electrodes 15a disposed in parallel, the electrode 15a being transparent to the reading light and extending linearly. A storage section 16 for storing charges generated in proportion to the dose of radiation is formed at the interface between the recording photoconductive layer 12 and charge transport layer 13.

In FIG. 1, only a signal detection apparatus 30 connected to one of the linear electrodes 15a of the radiation image recording unit 10 is shown, and other signal detection apparatuses 30 connected to other linear electrodes 15a are omitted in the drawing for clarity.

The A/D converter 35 may be provided for each of the linear electrodes 15a, or a single A/D converter 35 may be shared by the linear electrodes through provision of a multiplexer, in which analog signals outputted from the differential amplifiers 34 of the respective linear electrodes 15a are switched and inputted to the single A/D converter 35.

The radiation image recording unit 10 and the readout light source unit 20 are disposed such that the longitudinal direction of the readout light source of the readout light source unit 20 is substantially orthogonal to the longitudinal direction of the linear electrodes 15a of the radiation image recording unit 10. The readout light source unit 20 scans the readout light by moving the linear readout light source in the longitudinal direction of the linear electrodes 15a, but the moving mechanism for moving the readout light source is omitted in the drawing for clarity.

Hereinafter, an operation of the radiation image signal detection system will be described.

First, radiation L1 is irradiated toward a subject 40 from the radiation source with a voltage being applied to the radiation image recording unit 10 such that the first electrode layer 11 is negatively charged and the second electrode layer 15 is positively charged. As shown in FIG. 3A, the radiation L1 outputted from the radiation source is irradiated across the subject 40, and a portion of the radiation transmitted through a transparent section 40a of the subject 40, which transmits the radiation, is irradiated on the radiation image recording unit 10 from the side of the first electrode layer 11. The portion of the radiation irradiated on the opaque section 40b of the subject 40, which blocks the radiation, is not irradiated on the radiation image recording unit 10.

The radiation L1 irradiated on the radiation image recording unit 10 is transmitted through the first electrode layer 11 and irradiated on the recording photoconductive layer 12, which causes charge-pairs to be generated in the recording photoconductive layer 12. Positive charges of the charge-pairs so generated move to the negatively charged first electrode layer 11 where they are combined with the negative charges and disappear, while the negative charges of the charge-pairs are stored as charges of the latent image in a storage section 16 formed at the interface between the recording photoconductive layer 12 and charge transport layer 13. In this way, the radiation image is recorded in the radiation image recording unit 10.

Figure 3B:
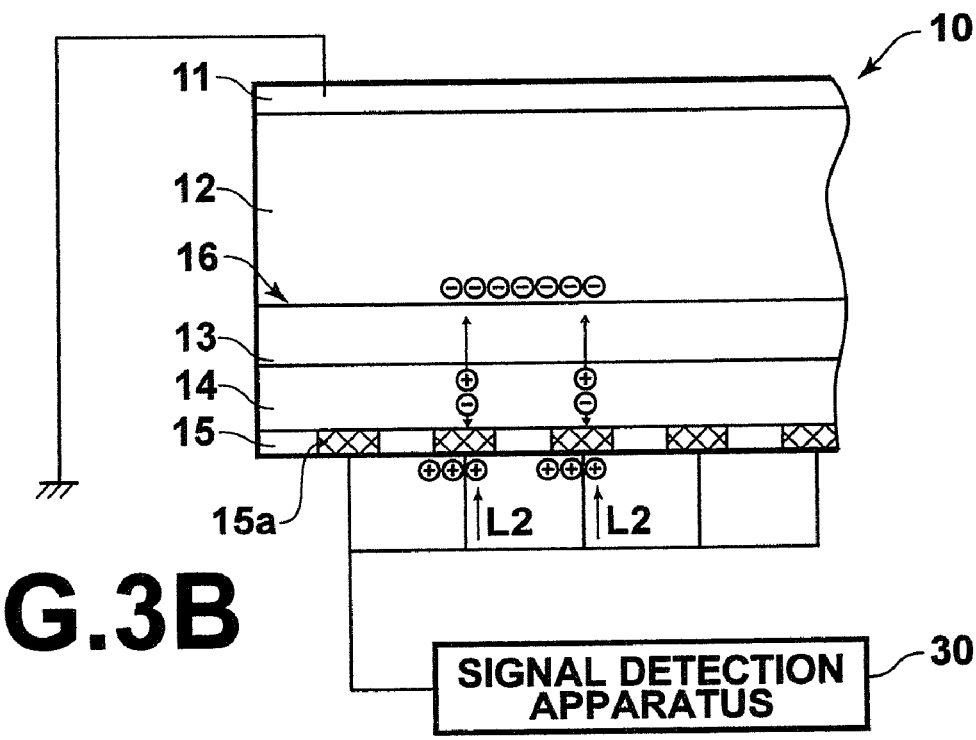
FIG. 3B illustrates an operation of the radiation image recording unit of the radiation image signal detection system shown in FIG. 1 when a radiation image is read out therefrom.

Thereafter, as shown in FIG. 3B, readout light L2 is irradiated on the radiation image recording unit 10 from the side of the second electrode layer 15 with the first electrode layer 11 being grounded. The readout light L2 is transmitted through the linear electrodes 15*a* and irradiated on the reading photoconductive layer 14. Positive charges of the charge-pairs generated in the reading photoconductive layer 14 by the irradiation of the readout light L2 are combined with the charges of the latent image stored in the storage section 16, while negative charges of the charge-pairs are combined with the positive charges charged on the linear electrodes 15*a* of the second electrode layer 15.

In the mean time, the reset switch S1 of the integrating amplifier 31 in the signal detection apparatus 30 is switched ON before the reading light is irradiated on the radiation image recording unit 10. Thereafter, the reset switch S1 is switched OFF, and the irradiation of the reading light is initiated after a baseline sampling is completed. Then, negative charges generated in the reading photoconductive layer 14 are combined with the positive charges charged on the linear electrodes 15*a* of the second electrode layer 15 in the manner described above. This causes charge signals to be stored in the capacitor 31*a* of the integrating amplifier 31 in proportion to the amount of combined charges and integrated.

Figure 4:
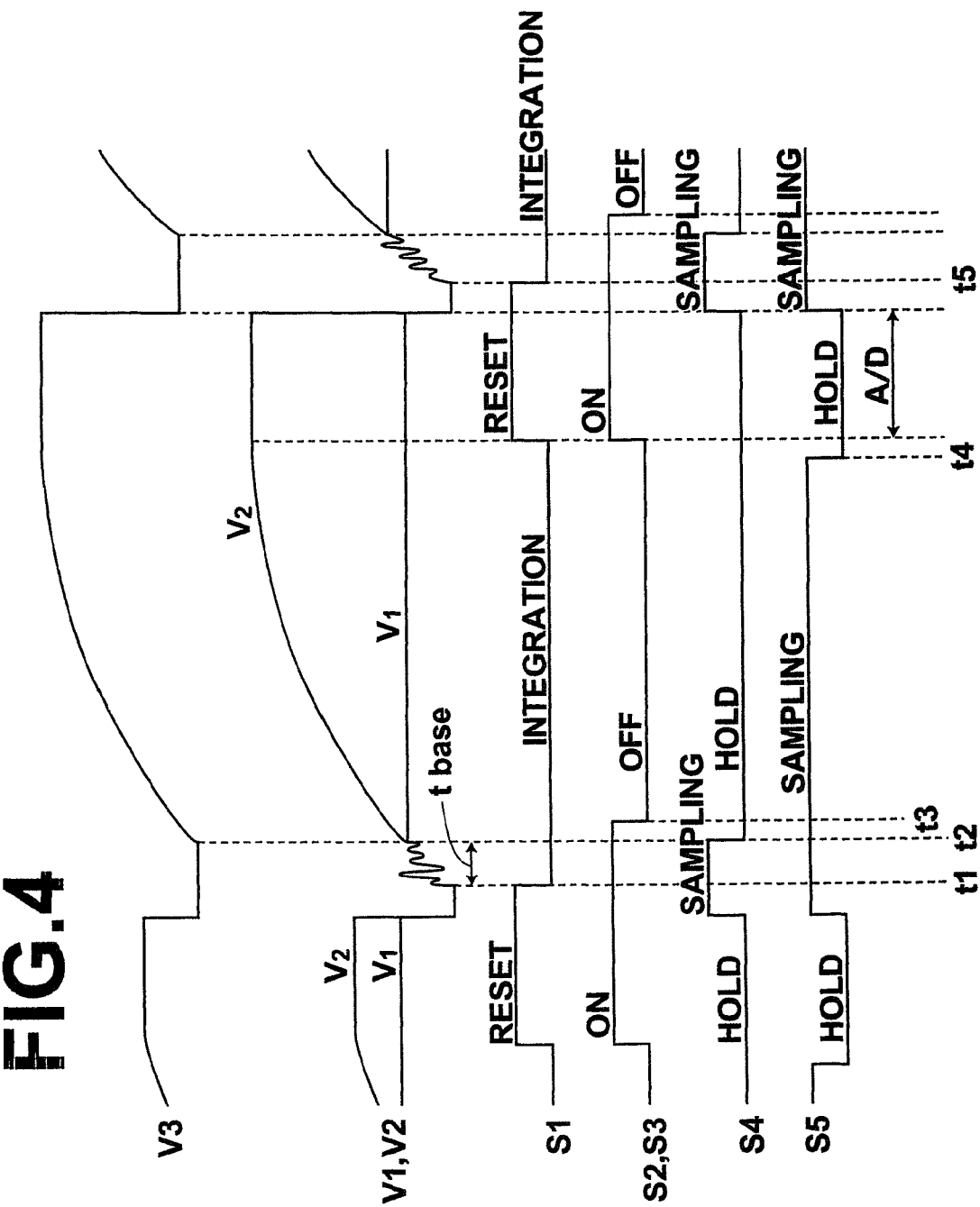
FIG. 4 is a timing chart illustrating operation timings of the signal detection apparatus of the radiation image signal detection system shown in FIG. 1.

An operation from the initiation of the integration onward will now be described with reference to FIG. 4. FIG. 4 illustrates ON/OFF control timings of the switches S1, S2, S3, S4, and S5, and schematic voltage waveforms at points V1, V2, and V3 in FIG. 1.

First, the integrating amplifier 31 initiates the integration of the charge signals at a time point t1 shown in FIG. 4, which is the time point at which the reset switch S1 of the integrating amplifier 31 is switched OFF.

At the integration start time t1 of the integrating amplifier 31, the switches S2, S4 of the first holding circuit 32, and switches S3, S5 of the second holding circuit 33 are in ON-state, as illustrated in FIG. 4, and a filtered electrical signal, integrated by the integrating amplifier 31 and filtered by the first low-pass filter, is stored in the capacitor C1 of the first holding circuit 32. In the second holding circuit 33, the second low-pass filter circuit is formed by the resistor R2, on-resistance of the switch S3, on-resistance of the switch S5, and capacitor C2, and a filtered electrical signal, integrated by the integrating amplifier 31 and filtered by the second low-pass filter, is stored in the capacitor C2 of the second holding circuit 33. Note that the time constant $\tau 2$ of the second low-pass filter and the time constant $\tau 1$ of the first low-pass filter are set equal to each other. Consequently, during the baseline sampling period (t1 to t2), V1=V2, and V3=0. That is, it is desirable for correlated double sampling that the time constant $\tau 1$=time constant $\tau 2$ during the baseline sampling period.

Then, at a time point t2 at which a predetermined baseline sampling time $t_{base}$ is elapsed after the integration is initiated by the integrating amplifier 31, the switch S4 of the first holding circuit 32 is switched OFF, and the first filtered electrical signal stored in the capacitor C1 is held.

At a time point t3, immediately after the first filtered electrical signal is held by the capacitor C1, the switch S2 of the first holding circuit 32 and the switch S3 of the second holding circuit 33 are switched OFF. That is, from this time point, low-pass filtering is performed by the second low-pass filter circuit on the electrical signal outputted from the integrating amplifier 31, and the second filtered electrical signal is stored in the capacitor C2 of the second holding circuit 33.

Thereafter, at a time point t4, which is the time point at which a predetermined sampling time is elapsed and just before the integrating amplifier 31 is reset, the switch S5 of the second holding circuit 33 is switched OFF, and the second filtered electrical signal stored in the capacitor C2 is held. Then, immediately after the time point t4, the switch S1 of the integrating amplifier 31 is switched ON to reset the integrating amplifier 31, and switches S2, S3 are switched ON again.

The first filtered electrical signal held by the capacitor C1 of the first holding circuit 32, and the second filtered electrical signal held by the capacitor C2 of the second holding circuit 33 are outputted to the differential amplifier 34 through the buffer amplifiers 36, 37 respectively. Then, the difference between the first and second filtered electrical signals is calculated in the differential amplifier 34 and outputted to the A/D converter 35. The A/D converter 35 converts a differential signal, which is an analog image signal inputted during a time period A/D shown in FIG. 4, to a digital signal and outputs as a digital image signal.

Then, at the time point when the A/D conversion is completed in the manner as described above, the switch S4 of the first holding circuit 32 and switch S5 of the second holding circuit 33 are switched ON again, and the switch S1 of the integrating amplifier 31 is switched OFF at a subsequent time point t5 to initiate integration again by the integrating amplifier 31.

In this way, with respect to a single line of light irradiation by the readout light source unit 20, the process from the initiation of the integration to the output of the digital image signal is performed by each of the signal detection apparatuses 30 connected to each of the linear electrodes 15*a*, thereby the image signal detection for that line is completed. Thereafter, the image signal detection for the subsequent lines of the readout light is performed in synchronization with the scanning of the linear readout light in Y direction indicated in FIG. 1 by the readout light source unit 20 to ultimately detect all image signals from the entire area of the radiation image recording unit 10.

According to the radiation image signal detection system described above, the time constant $\tau 1$ of the low-pass filtering in the baseline sampling, and the time constant $\tau 2$ of the low-pass filtering in the sampling of integrated signal are set to values that satisfy the relationship of $\tau 1 < \tau 2$, so that the speed of signal detection may be increased by reducing the value of $\tau 1$, and noise in the signal component may be reduced sufficiently by setting the $\tau 2$ to an appropriate value.

Figure 5:
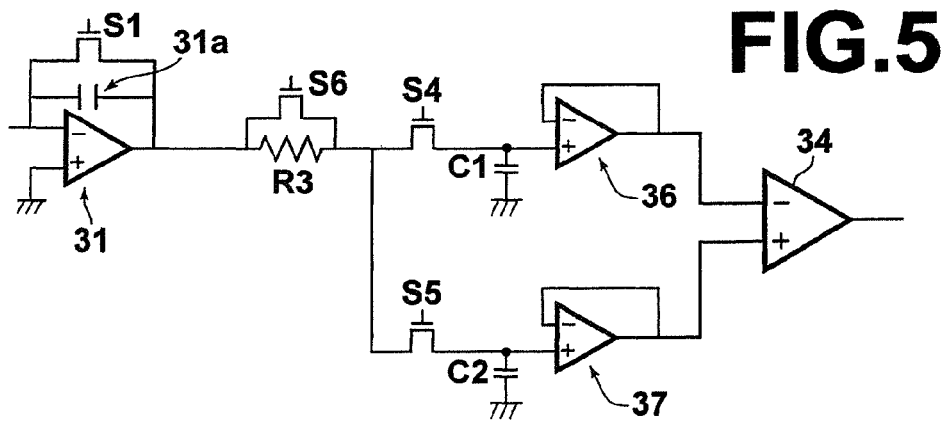
FIG. 5 illustrates another embodiment of the signal detection apparatus of the radiation image signal detection system shown in FIG. 1.

In the radiation image signal detection system described above, the first holding circuit 32 includes the switch S2, and the second holding circuit 33 includes the switch S3, and the first and second low-pass filters are switched by switching ON and OFF the switches S2, S3 to change the time constant. But, any circuit configuration may be adopted as long as it is capable of setting the time constant $\tau 1$ of the low-pass filtering in the baseline sampling, and the time constant $\tau 2$ of the low-pass filtering in the sampling of integrated signal to values that satisfy the relationship of $\tau 1 < \tau 2$. For example, as illustrated in FIG. 5, a circuit configuration that includes a resistor R3 and a switch S6 connected to the resistor R3 in parallel may be adopted. In this configuration, switches S6, S4 and S5 are switched ON to form a first low-pass filter by the on-resistance of the switch S6, resistor R3, on-resistance of the switch S4, and capacitor C1 in the baseline sampling, and in the sampling of integrated signal, the switches S6 and S4 are switched OFF and the switch S5 is switched ON to form a second low-pass filter by the resister R3, on-resistance of the switch S5, and capacitor C2. Then, by setting the resistance value r3 of the resistor R3 and the on-resistance value $R_{ON6}$ of the switch S6 to values that satisfy the relationship of r3>>$R_{ON6}$, the relationship between the time constant τ1 of the first low-pass filter and the time constant τ2 of the second low-pass filter may be set to satisfy τ2>τ1. For example, the resistance value r3 may be in the range from several hundreds of kΩ to a few dozens of MΩ. When the circuit shown in FIG. 5 is employed, the switch S6 is ON/OFF controlled in the same manner as the ON/OF control timings of the switches S2, S3 in the timing chart illustrated in FIG. 4, and other switches are controlled in the same manner as described above.

Preferably, the time constant τ1 of the low-pass filtering in the baseline sampling and baseline sampling time $t_{base}$ in the signal detection apparatus of the present embodiment are set to values that satisfy the relationship of $t_{base} \geq 10 \times \tau1$, and more preferably $20 \times \tau1 \geq t_{base} \geq 10 \times \tau1$. By ensuring a sufficient time for the baseline sampling time $t_{base}$ as described above, a noise component may be sampled with a sufficient magnitude, thereby a signal-to-noise ratio of the signal after correlated double sampling may be increased.

Data indicating appropriateness of the relationship $t_{base} \geq 10 \times \tau1$ will be shown below.

Figure 6A:
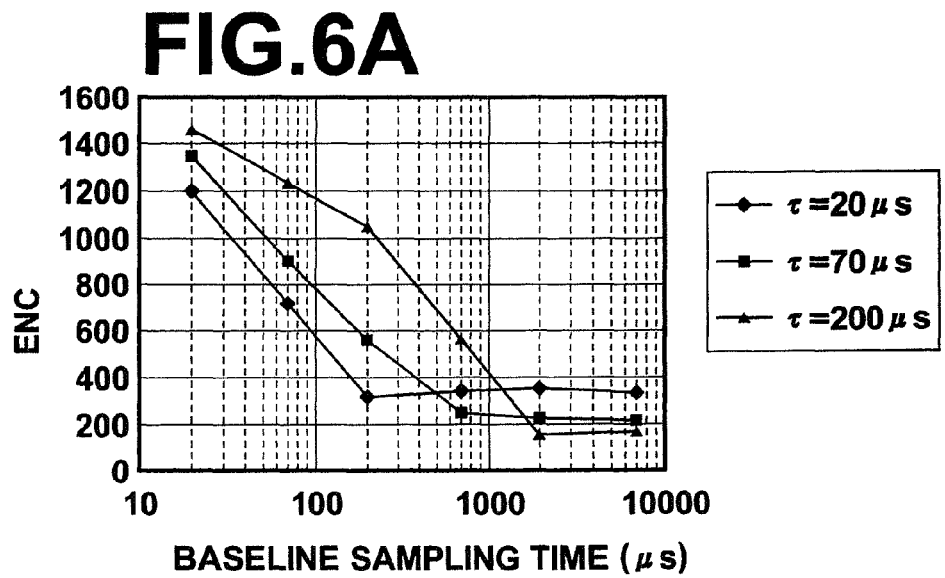
FIG. 6A is a graph illustrating the relationship between equivalent noise charge, ENC, and baseline sampling time of the integrating amplifier of the signal detection apparatus shown in FIG. 1.
Figure 6B:
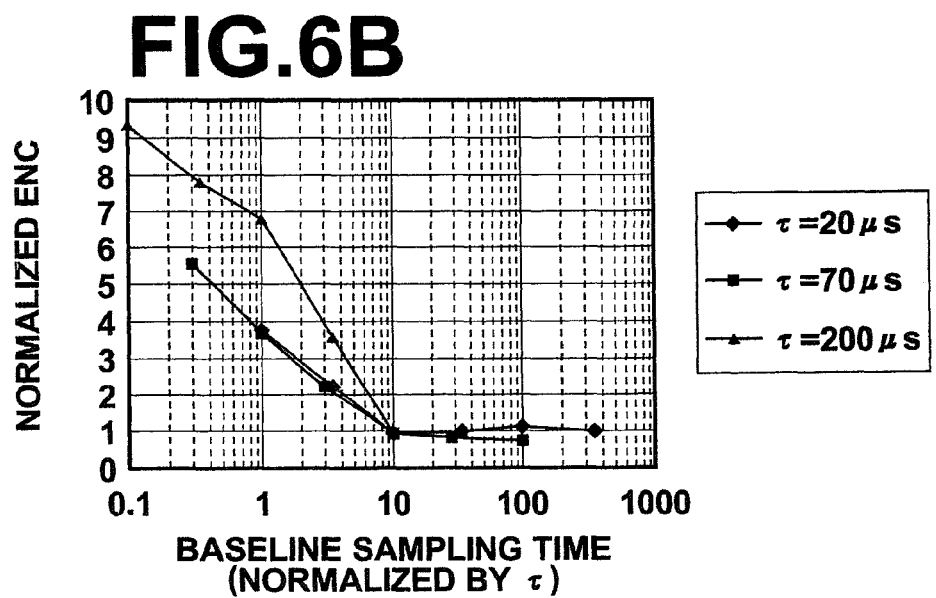
FIG. 6B is a graph illustrating the relationship between equivalent noise charge, ENC, and baseline sampling time of the integrating amplifier of the signal detection apparatus shown in FIG. 1.

Measurement results of equivalent noise charge, ENC, for the integrating amplifier 31, with the input terminal thereof being opened, of the signal detection apparatus 30 shown in FIG. 1 are provided in FIG. 6A. It illustrates the relationship between the baseline sampling time and ENC when the time constant τ1 of the low-pass filtering is set to 20, 70, and 200 μs. The referent of "ENC" as used herein is the standard deviation of equivalent charge amount N which is calculated by the formula shown below. The magnitude of the noise component included in the signal outputted from the signal detection apparatus 30 may be evaluated through the evaluation of ENC.

$$N = C_f \times V_{ad} \times x / q \times G \times 2^n$$

where, q: elementary charge ($1.6 \times 10^{-19}$(C))
$C_f$: feedback capacitance of the integrating amplifier
G: gain in the latter stages of the integrating amplifier
$V_{ad}$: input voltage range of the A/D converter
n: bit count of the A/D converter
x: digital data outputted from the A/D converter As shown in FIG. 6A, when τ1=20 μs, the ENC is substantially minimized when the baseline sampling time is approximately 200 μs or greater. When τ1=70 μs, the ENC is substantially minimized when the baseline sampling time is approximately 700 μs or greater. When τ1=200 μs, the ENC is substantially minimized when the baseline sampling time is approximately 2000 μs or greater. This proves that when the baseline sampling time $t_{base}$ is, $t_{base} \geq 10 \times \tau1$, the noise component of the digital image signal outputted from the signal detection apparatus 30 is minimized. FIG. 6B illustrates the measurement data of FIG. 6A normalized by the time constant τ1 and ENC value at 10×τ. Also, from FIG. 6B, it is evident that ENC is minimized when $t_{base} \geq 10 \times \tau1$.

Figure 7A:
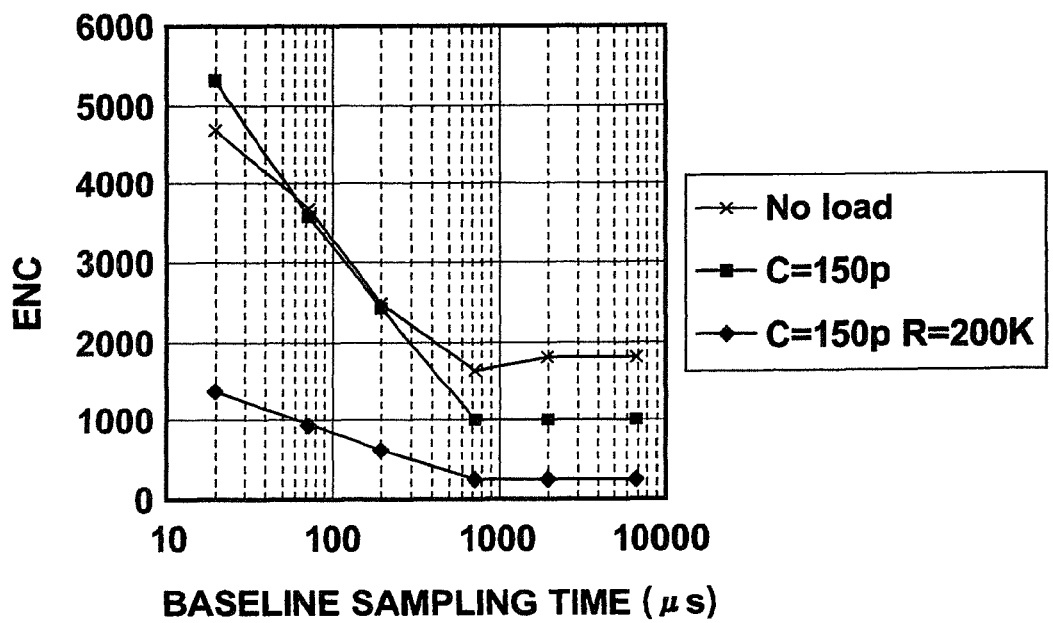
FIG. 7A is a graph illustrating the relationship between equivalent noise charge, ENC, and baseline sampling time of the integrating amplifier of the signal detection apparatus shown in FIG. 1.
Figure 8:
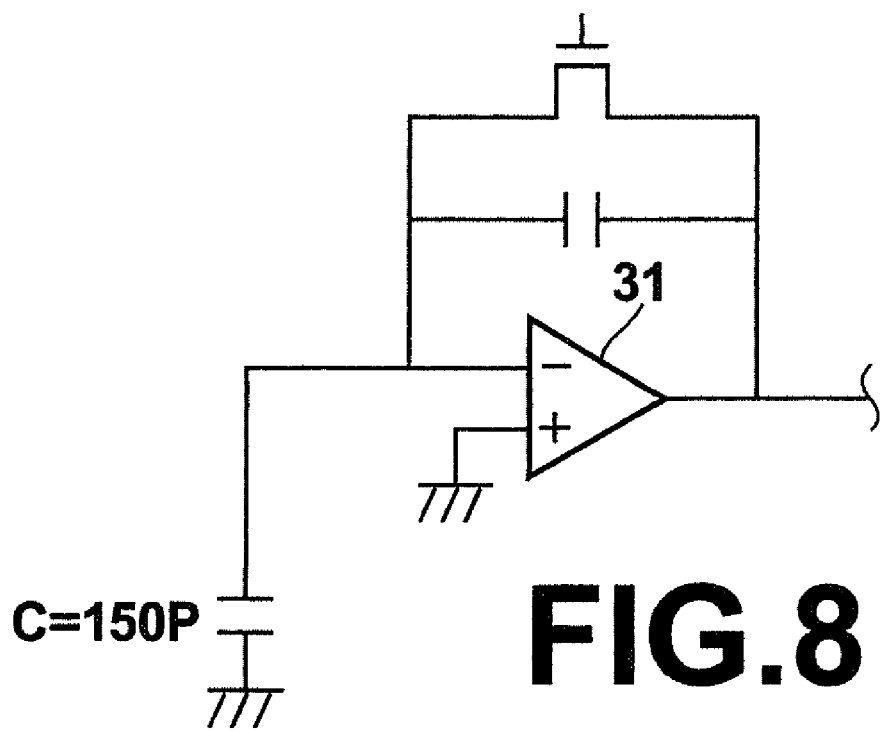
FIG. 8 illustrates a load connected to the input of the integrating amplifier when an ENC evaluation is performed.
Figure 9:
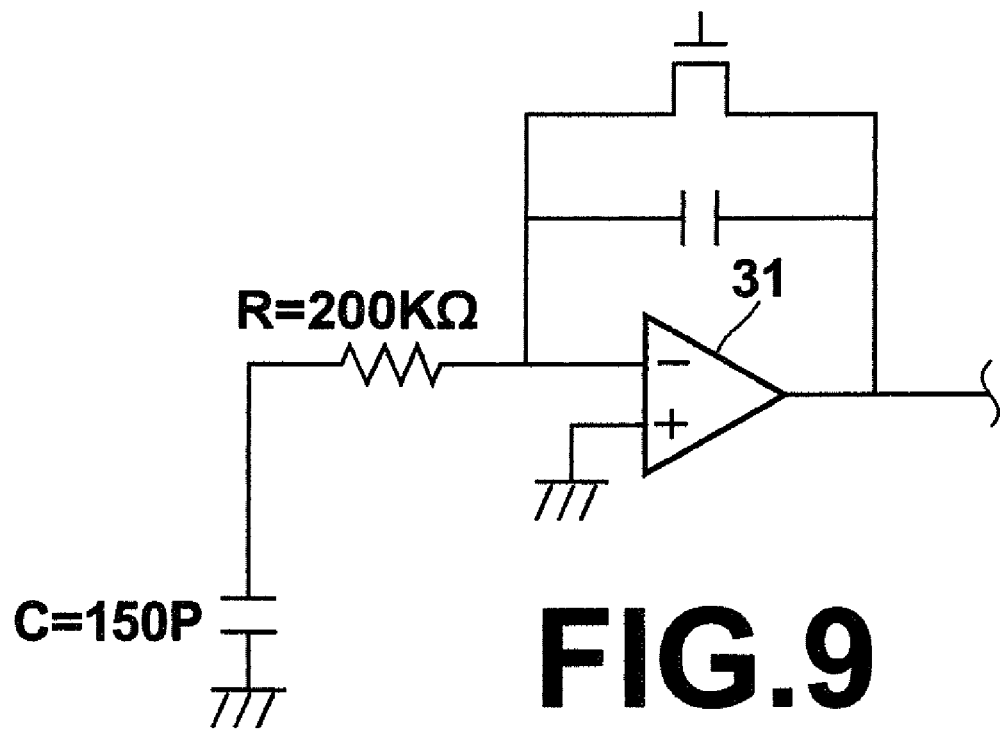
FIG. 9 illustrates loads connected to the input of the integrating amplifier when an ENC evaluation is performed.

Next, measurement results of equivalent noise charge, ENC, for the integrating amplifier 31 of the signal detection apparatus 30 shown in FIG. 1 conducted by connecting a predetermined load to the input of the integrating amplifier 31 are shown in FIG. 7A. FIG. 7A shows the measurement results when no load (open), a capacitor C=150p as shown in FIG. 8, or a capacitor C=150p and resister element R=200KΩ as shown in FIG. 9 are connected to the input of the integrating amplifier 31. The time constant τ1 of the low-pass filtering is set to 70 μs. The reason for connecting such loads as described above to the input of the integrating amplifier 31 is to simulate the case where the linear electrode 15a of the image recording unit 10 is connected to the signal detection apparatus 30.

Figure 7B:
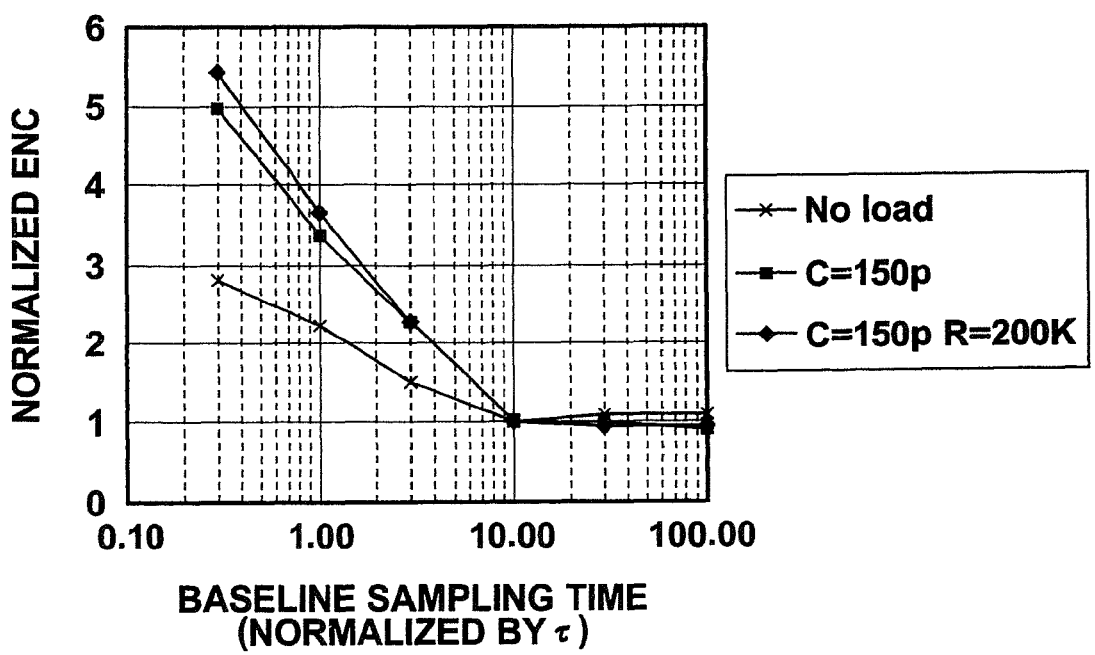
FIG. 7B is a graph illustrating the relationship between equivalent noise charge, ENC, and baseline sampling time of the integrating amplifier of the signal detection apparatus shown in FIG. 1.

As shown in FIG. 7A, in any of the loaded conditions, the ENC is minimized when the baseline sampling time is 700 μs or greater. This shows that the noise of the digital image signal outputted from the signal detection apparatus 30 is minimized when $t_{base} \geq 10 \times \tau1$, regardless of input load conditions. FIG. 7B illustrates the measurement data of FIG. 7A normalized by the time constant τ1=70 μs and ENC value at 10×τ1=700 μs. Also, from FIG. 7B, it is evident that ENC is minimized when $t_{base} \geq 10 \times \tau1$, regardless of input load conditions. The data shown above are those when τ1=20, 70, or 200 μs, but it is evident from the data that $t_{base} \geq 10 \times \tau1$ is desirable also when τ1=1 to 10 μs.

In the present embodiment, a so-called optical readout type radiation image detector is described as the device for outputting charge signals to be inputted to the signal detection apparatus. But the present invention is not limited to this, and, for example, a so-called TFT type radiation image detector may be used. Further, the radiation image detector that detects photostimulated luminescence emitted from a storage phosphor sheet through a photoelectric converter and outputs charge signals may also be used.

Further, in the present embodiment, the radiation image detection system is constituted by the radiation source, radiation image recording unit 10, readout light source unit 20, and signal detection apparatus 30. But the system may be constituted by the radiation image recording unit 10, readout light source unit 20, and signal detection apparatus 30, without the radiation source.

The invention claimed is:
1. A signal detection method comprising the steps of:
   initiating integration of charge signals by an integrating amplifier;
   holding a first electrical signal integrated by the integrating amplifier during a time period from the start of the integration to the end of a predetermined baseline sampling time, and passed through a first low-pass filter having a time constant τ1; and
   performing signal detection by obtaining the difference between a second electrical signal and the first electrical signal, the second electrical signal being an electrical signal integrated by the integrating amplifier during a time period from the start of the integration to a predetermined time point which is a time point before the integrating amplifier is reset after the first electrical signal is obtained, and passed through a second low-pass filter having a time constant τ2 which is greater than the time constant τ1.

2. The signal detection method as claimed in claim 1, wherein the time constant τ2 is set to the same value as that of the time constant τ1 during the time period from the start of the integration to the end of the predetermined baseline sampling time.

3. A signal detection apparatus comprising:
   an integrating amplifier for integrating charge signals;
   a first low-pass filter, having a time constant τ1 for receiving a signal integrated by the integrating amplifier during a time period from the start of the integration by the integrating amplifier to the end of a predetermined baseline sampling time; a first holding circuit for holding a first electrical signal passed through the first low-pass filter;

a second low-pass filter, having a time constant $\tau 2$ which is greater than $\tau 1$, for receiving a signal integrated by the integrating amplifier during a time period from the start of the integration by the integrating amplifier to a predetermined time point which is a time point before the integrating amplifier is reset after the first electrical signal is obtained;

a second holding circuit for holding a second electrical signal passed through the second low-pass filter; and a differential circuit for performing signal detection by obtaining the difference between the second electrical signal and the first electrical signal.

4. The signal detection apparatus as claimed in claim 3, wherein the time constant $\tau 2$ is set to the same value as that of the time constant $\tau 1$ during the time period from the start of the integration to the end of the predetermined baseline sampling time.

5. A radiation image signal detection method in which charge signals outputted from a radiation image recording unit, which stores charges therein by receiving radiation and outputs charge signals according to the charges stored therein, are detected using the signal detection method as claimed in claim 1.

6. A radiation image signal detection system, comprising:
the signal detection apparatus as claimed in claim 3; and
a radiation image recording unit that stores charges therein by receiving radiation and outputs charge signals to the signal detection apparatus according to the charges stored therein.

* * * * *